United States Patent [19]

Edelson

[11] Patent Number: 5,437,706

[45] Date of Patent: Aug. 1, 1995

[54] METHOD FOR OPERATING A BLAST FURNACE

[75] Inventor: Jonathan Edelson, Princeton, N.J.

[73] Assignee: Borealis Technical Incorporated Limited, Eli, Israel

[21] Appl. No.: 258,506

[22] Filed: Jun. 10, 1994

[51] Int. Cl.$^6$ ............................................. C21B 5/00
[52] U.S. Cl. ........................................ 75/471; 75/458; 75/459
[58] Field of Search ........................... 75/471, 458, 459

[56] References Cited

U.S. PATENT DOCUMENTS

| | | | |
|---|---|---|---|
| 3,811,869 | 5/1974 | Ponghis | 75/459 |
| 3,955,963 | 5/1976 | Ponghis | 75/459 |
| 4,421,553 | 12/1983 | Ponghis | 75/458 |

OTHER PUBLICATIONS

Gretz, Korf; and Lyons; Hydrogen in the Steel Industry; 1991, Jun. pp. 691–693.

Lankford, William T, Jr., editor; The Making, Shaping, and Treating of Steel Association of Iron & Steel Engineers, Publisher, 1985.

Primary Examiner—Peter D. Rosenberg

[57] ABSTRACT

In a method for operating a blast furnace, the primary supply of reductant and heat is an hydrogen reducing blast. Oxygen or water vapor is injected into the blast furnace to control temperature. Coke is used to provide appropriate gas channels and carburization. Coke use rate can be reduced to less than 10% of that of conventional blast furnace operation. A conventional blast furnace may be converted to this method with minor modification.

3 Claims, No Drawings

METHOD FOR OPERATING A BLAST FURNACE

CROSS-REFERENCE TO RELATED APPLICATIONS

This invention may be used as the reduction process identified in my patent application soon to be filed under the title "Method for the Production of Steel."

BACKGROUND

1. Field of Invention

The present invention relates to the smelting reduction of iron ore in a blast furnace.

2. Discussion of Prior Art

Conventional steel production methods make extensive use of fossil fuels. Use of these fuels leads to many undesired side products such as carbon dioxide, carbon monoxide, sulfur dioxide, nitrogen oxides, and others. Many of these side products are released into the atmosphere, for example, through smoke stacks. The use of fossil fuels has a detrimental impact on the environment: acid rain, airborne carcinogens, global warming, and smog are all partially attributed to fossil fuel use. To account for the externalities of fossil fuels, various carbon taxes have been proposed. If such taxes become law, then there will be a strong profit motive to move away from fossil fuels.

The most energy intensive step in steel making is the initial reduction of the iron ore to the metallic state. Most commonly, this reduction step is accomplished through the use of a blast furnace. These furnaces consume vast quantities of coal (i.e. fed as coke), both to heat the reduction reaction and to supply the reductant gas. Alternatives to the blast furnace process have used natural gas for the reduction process. These alternate processes have led to greater energy efficiency and lower carbon emissions. However, the products of direct-reduction processes are not generally usable in steel-conversion processes which expect blast furnace metal, owing to the low carbon content of the reduction product. Additionally, carbon emissions can not be eliminated through the use of alternative fossil fuels such as natural gas.

Another possibility which is a well-known process is the injection of hot reducing gas at the level of the main tuyeres of the blast furnace in order to reduce coke consumption. This reducing gas contains primarily CO, $H_2$, and possibly $N_2$, as well as small amounts of $CO_2$ and $H_2O$. In U.S. Pat. No. 4,421,553 to Ponghis et al. (1983), this process is taught in detail. Ponghis et al. teach not only the reduction process, but methods for controlling several blast furnace parameters, including pig iron temperature, Si content, coke rate, hot metal production rate, and top gas temperature. While this patent discloses coke rate reductions of up to 85%, carbon dioxide emissions remain high as the coke used is replaced by other carbonaceous fuels.

In a paper by J. Gretz et al., published in the International Journal of Hydrogen Energy, volume 16, number 10, pages 691-693 (1991) hydrogen produced via electrolysis from hydroelectric power was proposed as a steel plant fuel. Although this paper presents a viable alternative to fossil fuels, it does not present any method for the actual use of hydrogen in this fashion.

BRIEF SUMMARY OF THE INVENTION

Accordingly, the object of the present invention is to reveal a method for operating a blast furnace using injection of reductant gas at the level of the main tuyeres, the improvement being that hydrogen is injected as the primary reductant gas, a minimum of coke being charged into the furnace for non-reductant purposes. The process of Ponghis et al. may be implemented in an improved fashion using hydrogen reductant. Furthermore, heat for the reduction process may be provided through several means. Electric heating of the reductant blast in the manner of Ponghis et al., can be used to provide a high temperature blast. Preferentially, oxygen can be injected in order to provide the heat simply by combusting with a quantity of the reductant hydrogen.

OBJECTS AND ADVANTAGES

Accordingly, besides the objects and advantages of the Method for Operating a Blast Furnace described in my above patent, several objects and advantages of the present invention are the following:

It is an object of the present invention to provide a method for the operation of a blast furnace wherein the hot oxidizing blast used in conventional blast furnace operations is replaced with a hydrogen blast.

An advantage of the present invention is that carbon dioxide emissions are greatly reduced over conventional blast furnace operations.

An advantage of the present invention is that the introduction of impurities from the fossil fuels commonly used in blast furnace operations is greatly reduced.

An advantage of the present invention is that coke consumption will be greatly reduced.

An object of the present invention is to provide a means by which hydrogen is used as the primary reductant of a blast furnace. Coke is still used to maintain gas channels and to carburize the pig iron product.

An advantage of the present invention is that molten iron of high carbon content can be produced.

An advantage of the present invention is that a blast furnace operated in the method of the invention will be compatible with conventional blast furnaces used in current integrated steel mills.

Further objects and advantages will become apparent from a consideration of the ensuing description.

DESCRIPTION OF INVENTION

The present invention is a method for the operation of a blast furnace generally of the conventional type, with modifications. As such, descriptions of conventional blast furnace operations will not be given.

The main modification over conventional blast furnace operations is the replacement of the oxidizing hot blast with a blast of hydrogen gas. The hydrogen gas acts as a reducing agent, removing the oxygen from the iron ore forming metallic iron. Hydrogen requirements for the reduction will be in the range of 40 kg to 100 kg per metric tonne of pig iron produced.

Heat necessary for the reduction reaction is provided via the introduction of oxygen through secondary tuyeres placed above the level of the main tuyeres. This oxygen combusts with a fraction of the hydrogen reductant, producing the needed heat. Oxygen requirements for heating will be in the range of 50 kg to 200 kg per metric tonne of pig iron produced.

Coke is needed for blast furnace operation. In conventional blast furnace operation, the coke serves as a source of reductant, as a heating agent, as a carburizing agent, as a support for the melting ore, and as a matrix which provides gas flow paths for the hot blast. In the present invention, the reductant and heating needs are met through the use of hydrogen. However the other needs are still met through the use of coke. Coke rate is substantially reduced, however, from over 700 kg per metric tonne of pig iron produced, down to between 10 kg and 200 kg per metric tonne of pig iron produced.

Full control of process parameters, in the fashion of Ponghis et al. can be achieved, although this is not necessary to the embodiment of the current invention. The control of process temperature is through the adjustment of oxygen injection. The control of total gas flow is through the adjustment of hydrogen blast rate. The control of reductant to oxidant ratio is through the adjustment of total oxidant injected. Should the need arise to increase the oxidant rate without increasing processes temperature, water can be injected in the place of oxygen.

Recycling of top gas is complicated by the presence of carbon. In the preferred embodiment of the invention, the coke rate is set such that the coke provides precisely the amount of carbon needed in the product pig iron, and only a very small quantity of carbon dioxide will be found in the top gas. In this case, the top gas can be recycled by the condensation of the byproduct water vapor. If coke rate is greater than this, then top gas recycle will require the use of carbon dioxide removal methods. Alternatively, when carbon dioxide is present in the top gas, the top gas may be used elsewhere for its heating value rather than being recycled.

If coke rate is maintained below 50 kg per metric tonne of product pig iron, then most of the carbon present in the charged coke will end up in the product pig iron. This allows for control of product carbon content through control of coke feed rate. A coke rate of about 10 kg per metric tonne of product pig iron will result in the carbon content of the product pig iron being on the order of one percent. Coke rates this low have not been demonstrated.

SUMMARY, RAMIFICATIONS, AND SCOPE

While my above description contains many specificities, these should not be construed as limitations on the scope of the invention, but rather as an exemplification of one preferred embodiment thereof. Many other variations are possible. Accordingly, the scope of this invention should be determined not by the embodiment illustrated, but by the appended claims and their legal equivalents.

I claim:

1. A method of reducing ore in furnace means, wherein a charge of ore and coke descend, said ore being melted and reduced, the method comprising the steps of: feeding ore and coke continually into the top of said furnace means; tapping metal and slag continually from the hearth of said furnace means; continuously injecting a reducing gas into the lower part of said furnace means, the improvement wherein being injecting oxygen at a level above that of the injection of said reducing gas whereby the thermal requirements for said melting and reduction not met by heat carried by said reducing gas are satisfied by exothermic reaction between said oxygen and said reducing gas.

2. A method as in claim 1 wherein said furnace means is substantially similar to a conventional blast furnace, wherein said reducing gas is injected through tuyers, said tuyers being located as in a conventional blast furnace, and said oxygen being injected through secondary tuyers located above the reducing gas tuyers.

3. A method as in claim 1 wherein said reducing gas is hydrogen.

* * * * *